Fig. 1.

INVENTORS
DONALD L. KING
KENT L. DAVIS

BY Harold T. Stowell

ATTORNEY

Aug. 11, 1959  D. L. KING ET AL  2,899,068
PRESSURE FILTER CONSTRUCTION
Filed April 21, 1955  8 Sheets-Sheet 2

INVENTORS
DONALD L. KING
KENT L. DAVIS
BY Harold T. Stowell
ATTORNEY

Aug. 11, 1959  D. L. KING ET AL  2,899,068
PRESSURE FILTER CONSTRUCTION
Filed April 21, 1955  8 Sheets-Sheet 4

INVENTORS
DONALD L. KING
KENT L. DAVIS
BY Harold T. Stowell
ATTORNEY

Aug. 11, 1959     D. L. KING ET AL     2,899,068
PRESSURE FILTER CONSTRUCTION Filed April 21, 1955     8 Sheets-Sheet 5

INVENTORS
DONALD L. KING
KENT L. DAVIS

BY Harold T. Stowell

ATTORNEY

Aug. 11, 1959    D. L. KING ET AL    2,899,068
PRESSURE FILTER CONSTRUCTION
Filed April 21, 1955    8 Sheets-Sheet 7

INVENTORS
DONALD L. KING
KENT L. DAVIS
BY Harold T. Stowell
ATTORNEY

Fig. 12.

INVENTORS
DONALD L. KING
KENT L. DAVIS

United States Patent Office 2,899,068
Patented Aug. 11, 1959

2,899,068
PRESSURE FILTER CONSTRUCTION

Donald L. King and Kent L. Davis, Salt Lake City, Utah, assignors, by mesne assignments, to The Eimco Corporation, Salt Lake City, Utah, a corporation of Delaware Application April 21, 1955, Serial No. 502,874

2 Claims. (Cl. 210—402)

The present invention relates to filters and more particularly and specifically to continuous rotary-type pressure or vacuum filters of drum or disc construction.

Numerous prior constructions of rotary drum or disc pressure filters are known and provided in the art; however, there are inherent structural disadvantages and operational problems in these prior constructions which render most of them unsatisfactory for one or more reasons.

The primary objections to most prior filter constructions of this type stem from inadequate sealing against pressure or vacuum loss, insufficient compensation for wear of moving parts and expansion and contraction of cooperative elements caused by temperature and pressure changes, and a lack of flexibility and adjustability of certain parts for achieving optimum efficiency under varying operating conditions.

It is, therefore, a general object of the present invention to provide a rotary pressure filter of unique construction and improved function which substantially eliminates all of those disadvantages and problems inherent in prior constructions of like filters.

It is a primary object of the present invention to provide a rotary filter construction embodying a unique and improved suction and filter valve assembly on one side of the drum or disc together with a novel driving assembly on the other side, which two assemblies cooperate to produce a flexible system capable of automatic adaptation to variations in operating temperatures and pressures without producing stresses in and wear of the various parts of the filter apparatus.

It is also an important object of this invention to provide a new and improved valve structure for a rotary pressure filter construction which will, in its application to vacuum filters, prevent atmospheric contamination of filtrate and gases within the filter, and, in application to pressure filters, prevent leakage of internal gases and filtrate which may be valuable, toxic, explosive or the like.

Another object of the present invention is the provision of a unique and improved filter construction embodying the novel valve and drive assemblies described above wherein the filter drum may be quickly and easily disconnected from the drive and valve assemblies for removal of the drum from the shell, and wherein the valve assembly may be quickly and easily adjusted or removed without disturbing the drum or the drive assembly.

A further object of this invention is to provide a rotary pressure filter having an improved and unique drive assembly for the rotary drum or disc wherein a novel pressure seal is provided where the drive connection from the external source enters the filter shell, and wherein new and improved construction is provided in a flexible connection between the rotary drum or disc and the external drive source to compensate for expansion, contraction and wear.

Another object is the provision of an improved flexible and quick detachable connection between the driving assembly and the rotary drum or disc whereby either component may be quickly and easily removed and replaced as a unit without disturbing the other.

Still a further object of this invention is the provision of new and improved trunnion supports and gas and liquid shields therefor on the drive end and the filter end of the drum or disc support.

It is also an object of this invention to provide a unique suction and filter valve assembly and support which provides for a flexible connection between the nonrotatable filtrate suction unit of the filter and the components of the filter valve which rotate with the rotary drum or disc.

Still another object of the present invention resides in the provision of a combined filter valve assembly and a flexible connection between the valve assembly and the fixed filtrate suction unit which provides automatic compensation for contraction and expansion with changes in temperature and for wear between the several parts.

A still further object of this invention is the provision of a new and improved filter valve construction, assembly and support which enables rapid and easy adjustment of valve parts to provide for proper filter operation under varied conditions and to meet various functional requirements.

Yet another and most important object of this invention is the provision of a new and improved filter construction including a novel valve structure wherein the filtrate valve associated with the rotary drum or disc of the filter is exposed externally of the filter shell with a positive seal formed between the valve and the shell, the seal being effected in such a manner as to eliminate the requirement for a stuffing box by utilizing a flexible seal connector between the valve and the shell thereby permitting direct attachment of filtrate discharge lines, pressure gauges, blow connections and the like directly to the exposed face of the valve.

It is an additional object of this invention to provide a new and improved stuffing box construction between a straight flow suction discharge connection to the filter and the rotary drum or disc.

Still a further object of this invention is to provide a new and improved rotary pressure filter which incorporates all of the foregoing structural advantages to produce a filter of improved and unique construction functioning to produce new and useful results.

It is also an object of this invention to provide a new and improved filter of the type set forth which is of relatively simple and inexpensive design and manufacture and which is highly efficient and durable in operation.

Still further objects and advantages of the improved structure and function of the present invention will become readily apparent to those skilled in the art when the following general statement and description are read in the light of the annexed drawings.

The nature of the instant invention may be stated in general terms as comprising a rotary pressure filter including a shell, a rotary filter assembly in the shell, trunnions supporting each end of the filter assembly, a filtrate suction unit communicating through the shell with one end of the filter assembly, an axially flexible stuffing gland interposed between said suction unit and said filter assembly, a cycling filtrate valve associated with said flexible gland, a drive assembly having attachment through said shell with the second end of the rotary filter, a flexible coupling and stuffing gland associated with the drive assembly connection with the rotary filter, and liquid and vapor shields for said filter assembly trunnions having communication with the shell exterior.

Referring now to the accompanying drawings in which like numerals designate similar parts throughout the several views.

The improved structural features constituting the basic concept of the present invention are readily adaptable to rotary pressure or enclosed vacuum filters of either the drum or disc type and which operate either with a peripheral slurry feed or by rotary immersion within a slurry tank. The present invention is described hereinafter in the form of a rotary drum filter of a top feed type for purposes of clarity of understanding and without intention of limitation in scope beyond the limitations of the prior art and the appended claims.

Figure 1:
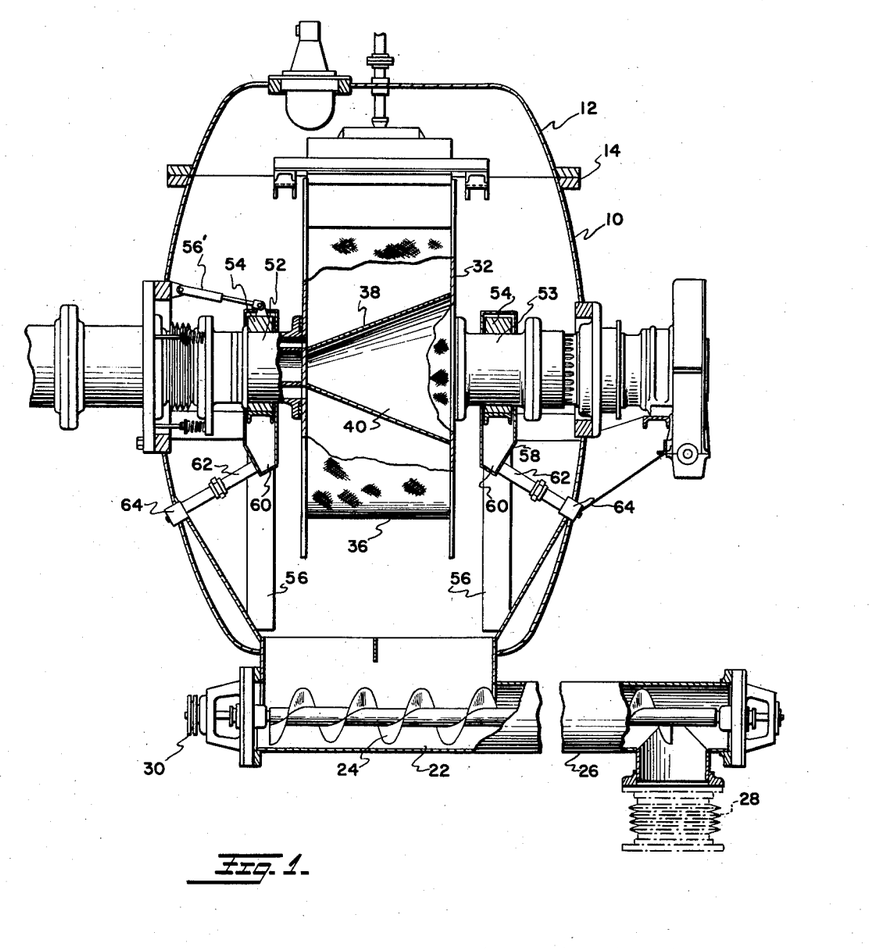
Fig. 1 is a side elevation in vertical section of the pressure filter constituting the present invention.
Figure 2:
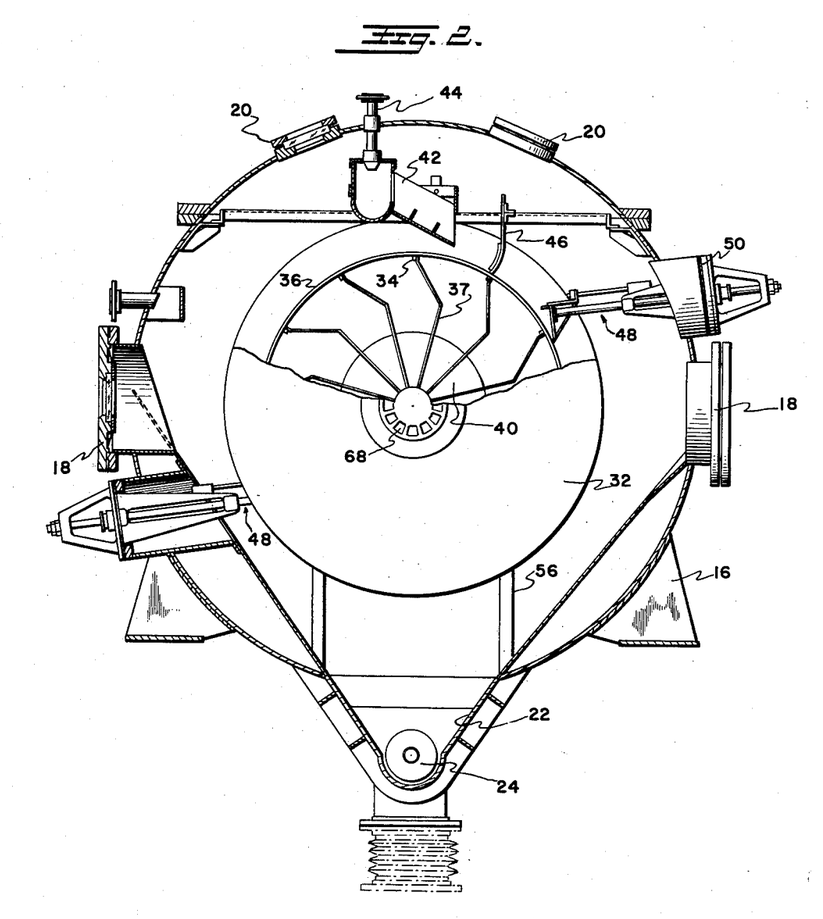
Fig. 2 is an end view in partial vertical section of the filter shown in Fig. 1.

Referring now to the drawings, and with particular reference to Figs. 1 and 2, the new and improved filter constituting the present invention is shown as including a closed cylindrical casing or shell 10, which may be divided along a horizontal plane at a point above its longitudinal axis to provide an upper removable head portion 12 which is retained in place on the shell by means of cooperative flanges 14 on the upper and lower shell portions which are bolted together. Suitable supporting members 16 are provided on the shell exterior for supporting the shell in an elevated position on suitable foundations which are not shown. The shell is additionally provided with suitably located manhole fittings 18 to permit working access to the shell interior and with glass enclosed sight ports 20 to permit visual inspection of the shell interior during operation.

Located centrally in the bottom of the shell is a V-shaped collection trough 22 which is provided longitudinally with a helical conveyor 24 which extends outwardly through a discharge tube 26 communicating with one end of the trough and which empties into a suitable discharge outlet 28. The helical conveyor is suitably journalled at each end and is powered from an external driving source as at 30 for the purpose of removing the usual cake deposits which collect in the trough as they are removed from the filter apparatus.

Mounted within the casing or shell 10 is a circular drum 32 having closed ends which are interconnected at equally spaced points about their periphery by solid strip members 34 over which is provided peripherally about the drum a filtering material or medium 36. Each of the strip members 34 supports one end of a division wall 37 which extends radially of the drum to locate its second end adjacent the drum axis thereby dividing the drum into a plurality of segmental filtering compartments each one of which terminates at its inner end adjacent the solid wall 38 of the cone-shaped partition 40.

Located above the drum within the head portion of the shell is a slurry feeding hopper 42 which receives a continuous feed of slurry through a feed pipe 44 entering through the top of the head and discharging into the hopper. The hopper is inclined so as to discharge the slurry onto the upper periphery of the drum against a bumper 46 which tends to retain the slurry in contact with the drum as it filters thereinto.

Also associated with the drum are a plurality of scrapers 48 which are secured in scraper ports 50 carried on the shell wall and which engage the filtering medium about the periphery of the drum at points just above and just below the axial center line of the drum to remove filter cake therefrom freeing it to fall into the collection and discharge trough 22 previously described.

The two enclosed ends 32 of the drum (rotary disc filters being similarly mounted) are provided with flanged tubular bearing shafts or trunnions 52 and 53, each of which is rotatably supported in a trunnion bearing 54. Each bearing in turn is supported within the shell by an inverted U-shaped framework of channel members 56 at the lower end and tie rods 56' at the upper end.

The tubular bearing shaft or trunnion 52 on one end of the drum is connected in a manner to be hereinafter described to the suction and filtrate valve assembly of the filter, while the bearing shaft or trunnion 53 on the second end of the drum is connected through the shell to an external drive assembly for the purpose of rotating the drum within the shell.

Each of the trunnion bearings 54 supporting the drum within the shell is provided with a box-like shield or housing 58 which entirely encloses the bearing on all sides, top and bottom, and which is provided with a restricted trough-like lower end 60 communicating by means of a flexible tube 62 with a valved fitting 64 in the shell wall whereby lubricating material may be introduced or withdrawn from the bearing shield from a point externally of the shell. The shields 58 also protect the bearing from contamination by foreign materials.

Figure 3:
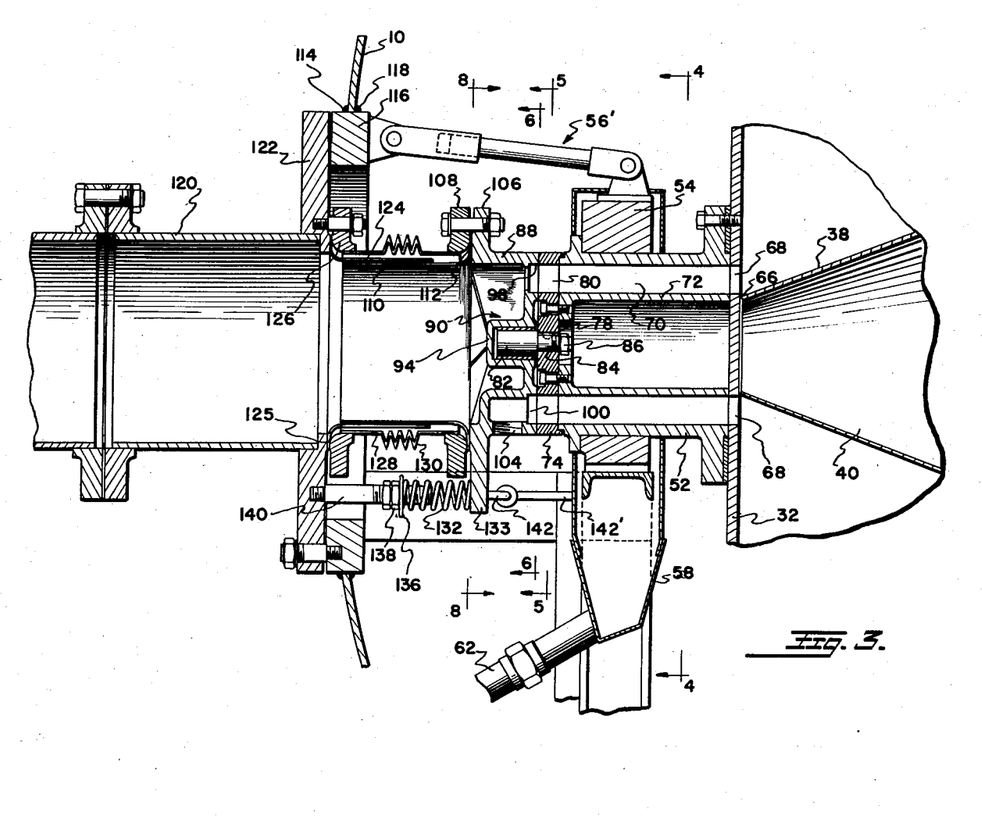
Fig. 3 is an enlarged fragmentary vertical section of the suction and filter valve assembly.

The filtrate suction and filtrate valve assembly, as best illustrated in Fig. 3, are associated with that end of the drum to which the reduced or apex end of the conical axis 40 of the drum is secured. The reduced end of the conical axis is welded or otherwise secured to the drum end as at 66 and each of the drum compartments is provided with a discharge opening 68 through the end wall of the drum into the trunnion 52 on the opposite face of the wall, the discharge openings from the multiple compartments being arranged concentrically about the reduced end of the conical drum axis where it is secured to the end wall of the drum.

Figure 4:
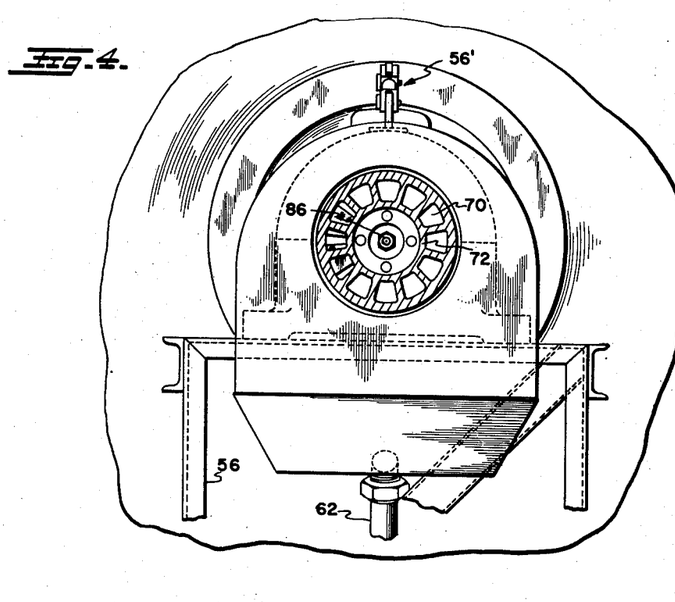
Fig. 4 is a vertical section on line 4—4 of Fig. 3.

The trunnion 52, as best seen in Fig. 4, is provided with a plurality of longitudinal passages 70 therethrough which are arranged concentrically about the axis of the shaft outwardly of a central tubular core 72 within the trunnion, the passages 70 through the tubular trunnion aligning one with each of the drum discharge outlets 68 whereby each outlet is provided with a passage through the trunnion.

Figure 5:
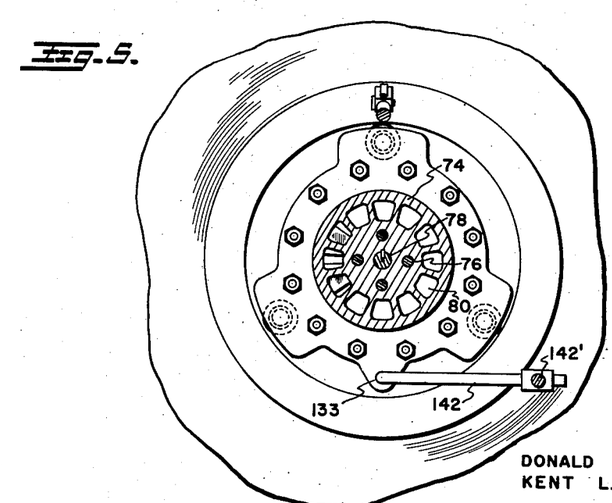
Fig. 5 is a vertical section on line 5—5 of Fig. 3.

Secured to the outer end of the tubular trunnion 52 is a valve wear plate 74, as best seen in Figs. 3 and 5, which includes a central body portion secured by circumferentially arranged bolts 76 to the inturned ends of the central core portion 72 of the tubular trunnion 52 and which is provided centrally with a keyed opening 78 for purposes to be hereinafter described. The wear plate 74 is provided with discharge openings 80 arranged concentrically about the central opening 78 in a manner to align them one with each of the discharge passages 70 in the trunnion when the wear plate is secured to the extended end of the shaft.

A cylindrical bearing post 82 is secured in an outwardly extending position from the center of the wear plate 74 by means of a keyed shank 84 extending axially from the bearing post into the keyed central opening 78 in the wear plate and secured therein by means of a nut 86 threadedly engaging the extended end of the shank behind the inner face of the wear plate.

Figures 6, 7:
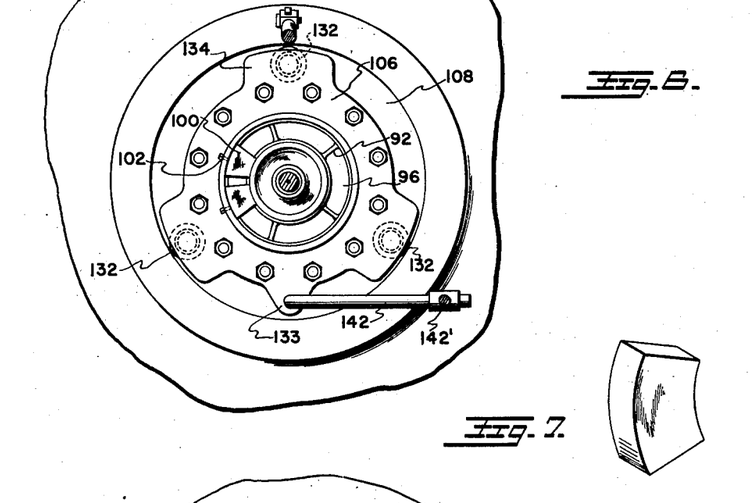
Fig. 6 is a vertical section on line 6—6 of Fig. 3.
Fig. 7 is a pictorial illustration of a valving bridge block.
Figure 8:
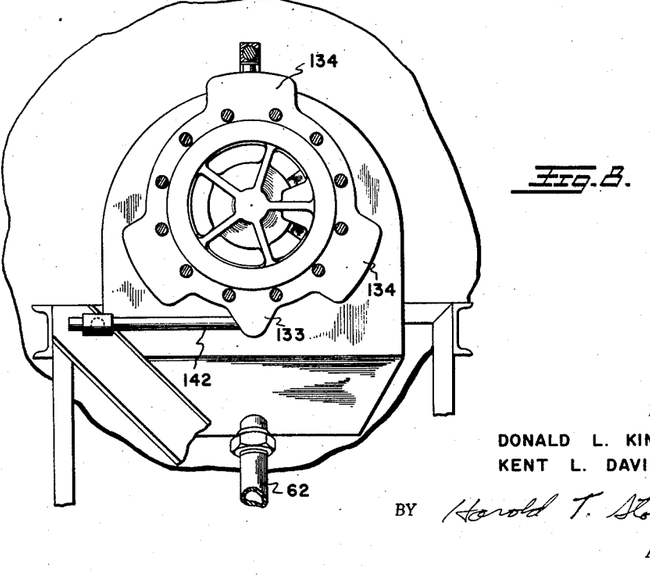
Fig. 8 is a vertical section taken on line 8—8 of Fig. 3.

Associated with the outer face of the wear plate 74 is a nonrotatable valve body member 88 which includes a tubular body having a hub portion 90 supported centrally thereof by a plurality of spaced radial web members 92 (Fig. 6).

The central hub portion 90 is provided with a cylindrical bearing post socket 94 which receives bearing post 82 therein and locates the nonrotatable valve body 88 flush with the outer face of the wear plate with the peripheral edge of the body member and the peripheral edge of the central hub forming flush sealing faces with the face of the wear plate on the inner and outer edges of the ports 80 in the wear plate.

The nonrotatable valve body member 88 is provided concentrically about the central hub with a plurality of ports 96 defined between the webs 92, and the outer subular wall of the body member, adjacent the face abutting the wear plate, is provided with an annular groove 98 for the reception of valve adjusting shutters or bridges 100, as seen in Fig. 7. The bridges 100 are solid arcuate segments which are secured by set screws 102, Fig. 6, in groove 98 about the face of the valve body between the hub and tubular outer wall to adjust the timing of the suction and blow portions of the valving cycle.

As seen in Fig. 3, one or more of the ports 96 in the nonrotatable valve body member 88 is enclosed within the body and communicates through a threaded socket 104 to a source (not shown) of compressed gas or fluid used to blow back into the drum to remove filter cake and the like in a manner heretofore well understood.

The outer end of the valve body member 88, remote to the wear plate 74, is provided with an annular flange 106 to which is bolted a circular guide and retaining collar 108.

Secured to the outer face of the valve body member 88 to extend for a spaced distance in alignment therewith is a tubular sleeve 110 which has an annular flange 112 secured between the collar 108 and flange 106.

Outwardly from the valve body member 88 the filter shell 10 is provided with an enlarged opening 114 of sufficient diameter to permit passage of the flanged valve body 88 therethrough. The shell opening 114 is provided with a collar 116 secured thereabout as at 118.

A filtrate suction line 120 provided with an annular face plate 122 is secured to the collar 116 to position the filtrate suction line in alignment outwardly from the end of the tubular extension 110 on the valve body 88. A second tubular sleeve 124 is secured to the inner face of the filtrate line face plate by an annular flange 125 on one end clamped between the face plate 122 and a second guide and retaining collar 126 bolted to the face plate 122 concentrically about suction line 120. This second tubular sleeve 124 is of slightly lesser diameter than sleeve 110 and telescopes into the outer end thereof to extend for a spaced distance within the length of sleeve 110 providing an axially movable slip joint between the valve body member 88 and the filtrate suction line 120.

The telescoped tubular filtrate carrying sleeves 110 and 124 are enclosed by a flexible tubular section 128 positioned concentrically about the telescoped sleeves and having each end thereof frictionally engaged in the throats of guide and retaining collars 108 and 126 thus forming a liquid and vapor seal around the telescopic sleeve joint.

The flexible tubular section 128 can be of a rubberized, plastic or metallic construction with a pleated bellows-like portion 130 therein permitting it to extend or contract longitudinally with axial telescopic slippage of the tube joint.

Associated with the foregoing filtrate valve and suction assembly is an arrangement of resilient means for biasing the valve body member 88 toward and against the face of wear plate 74. While any number of possible biasing structures would suffice, there is illustrated herein for purposes of illustration circumferentially spaced coil springs 132 seated each at one end against extended portions 134 of the valve body member flange 106, and each seated at its second end on a plate 136 adjustable by nuts 138 axially of a bolt 140 secured to inner face of the filtrate suction line face plate 122.

As is seen in Figs. 5 and 6 a control rod 142 is secured to the inner face of an extended portion 133 of the valve body member flange 106 and connects with cross rod 142' secured to the U-frame 56 to permit rotation of the valve body relative to wear plate 74 for controlled adjustment of the timing of the suction and blow portions of the valving cycle.

From the foregoing construction it becomes apparent that a filtrate valve and suction assembly together with a blow arrangement have been provided which include a new and unique flexible connection between the stationary filtrate suction line and the valve body with provision for expansion and contraction of the entire filter valve assembly without producing strain in any of the filter valve parts and without affecting the sealing contact between the mating nonrotatable and movable valve surfaces. Likewise, a filtrate valve and suction assembly has been provided with the improved advantages of flexibility while still maintaining a maximum efficiency in and control over the operation of the timed cycling valve which operates to alternately withdraw filtrate and blow the plural filter compartments successively around the drum in accordance with well understood prior practices as the valve wear plate rotates with the trunnion and drum in mating surface contact with the nonrotatable valve body.

It is additionally seen that it is possible to withdraw the entire nonrotatable valve assembly and flexible connection from the shell out of contact with the trunnion supported wear plate through the shell opening in which the filtrate suction line is attached for purposes of repair and replacement without dismantling any portion of the assembly. Further, the drum may likewise be removed through the upper head of the filter shell by the simple expedient of lifting the top half of the trunnion bearing and then lifting the drum after the valve assembly has been disconnected from the drum trunnion.

Figure 9:
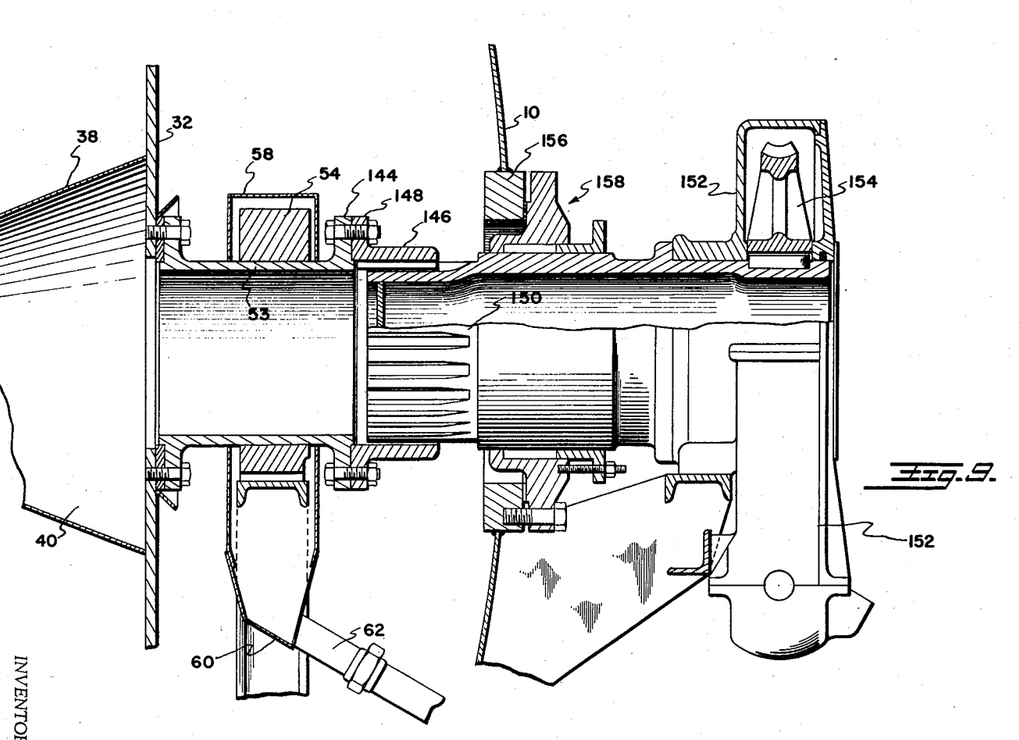
Fig. 9 is an enlarged fragmentary vertical section of the drive assembly and flexible coupling.

Referring now to Fig. 9 of the drawings, there is shown a drive assembly for rotating the drum within the shell which includes the heretofore described tubular trunnion 53 secured to the end wall of the drum and rotatably supported in bearing 54. In this construction the trunnion 53 is provided at its extended end with a flange 144 which supports in aligned extension with the trunnion an internally splined member 146 having an end flange 148 bolted to flange 144 of the trunnion 53 and receiving in the open extended end thereof a cooperatively splined tubular drive shaft 150 which extends outwardly through the wall of the filter shell 10 into a gear box 152 wherein it carries a gear wheel 154 fixed thereto and engaging a driving gear (not shown) driven from an external source.

Where the drive shaft 150 passes through the filter shell wall the filter shell is provided with an opening having a circular collar 156 secured in the opening and supporting about the shaft a stuffing gland generally designated at 158 sealing the shaft and the shell.

The foregoing drive assembly by reason of the telescopic splined connection between the drive shaft 150 and the internally splined member 146 carried by the trunnion 53 provides for a flexible coupling in an axial direction which readily compensates automatically for expansion and contraction of the filter assembly caused by variations in temperatures and pressure. Further, the splined flexible connection provides for the ready and easy removal of the drum from the filter casing without the necessity of disturbing the packing in the stuffing gland 158 about the drive shaft since it is possible to readily disconnect the internally splined member 146 from the trunnion sliding it outwardly on the drive shaft clear of the trunnion and then lifting the top half of the trunnion bearing 54 to permit the trunnion and drum to be lifted vertically from the shell.

Keeping in mind both the filtrate valve and suction assembly and the drive assembly aforedescribed, it is evident that a filter assembly has been provided which incorporates structure capable of permitting substantial axial and play of the drum and its supporting structure within the filter shell with variations in pressure and temperature and which provides for automatic compensation for wear of moving parts.

Figure 10:
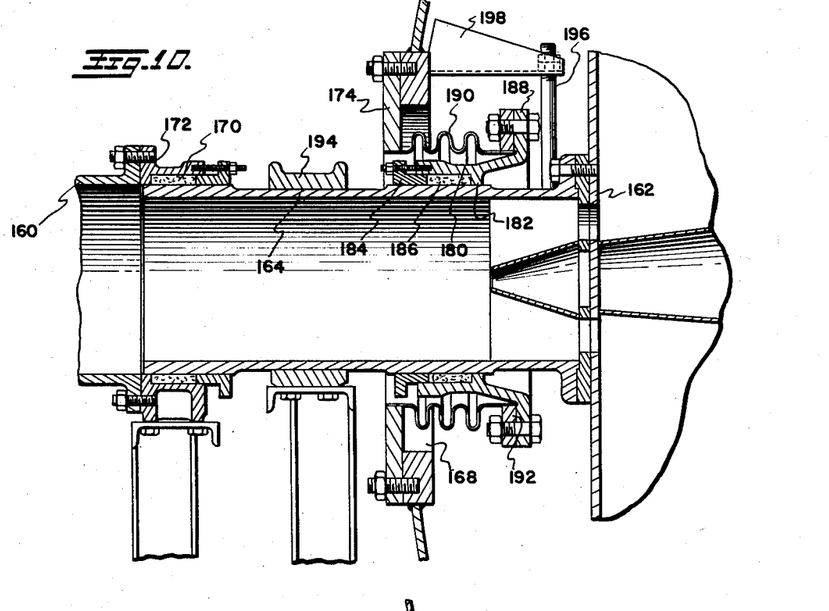
Fig. 10 is an enlarged fragmentary vertical section of a modified form of the filtrate suction assembly.

In Fig. 10 of the drawings there is shown a modified arrangement for connecting a filtrate suction line 160 to the discharge end 162 of a rotating drum wherein the discharge from the filter is without a valving or timing cycle.

In this modified construction a tubular shaft or trunnion 164 is secured to the end wall 162 of the rotary drum to extend centrally through an enlarged opening 168 in the shell wall with the extended end of the shaft communicating with a fixed filtrate suction line 160 with a packing gland 170 surrounding the trunnion end and coupled as at 172 to the filtrate suction line. A facing plate 174 is secured concentrically within the enlarged opening 168 in the filter shell wall and an elongated tubular collar 180 is positioned concentrically about the tubular shaft 164 immediately inwardly of the facing plate 174. The tubular collar is provided with an internal annular wall 182 intermediate its length bearing about its inner periphery against the outer wall of the tubular trunnion 164 and cooperating with a circular packing retainer 184 secured in the outer circumferential edge of the collar to form a packing gland 186 about the shaft 164. The innermost end of the collar 180 is provided with an annular flange 188 concentrically about the shaft 164.

A flexible tubular connection 190 of a bellows-type construction and of rubberized, plastic or metallic material has one end secured to the inner peripheral edge of the facing plate 174 with the second end extending inwardly to be secured by a locking ring 192 to the outer face of the flange 188 on the tubular collar 180.

To complete the present construction a bearing 194 is supported externally of the shell to receive and rotatably support the tubular trunnion 164, and retaining or stay rods 196 are supported by brackets 198 from the inner wall of the shell and engage the flange 188 of the tubular collar 180 to retain it against rotation.

From this foregoing modified construction, it is seen that an axial flexible connection is made between the discharge side of the rotary drum and the filtrate suction line 160 through the medium of a rotating tubular trunnion which is provided with a stuffing gland at its point of jointure with the filtrate suction line and which is provided with a flexible sealing gland between the tubular trunnion and the fixed wall of the filter shell.

Figure 11:
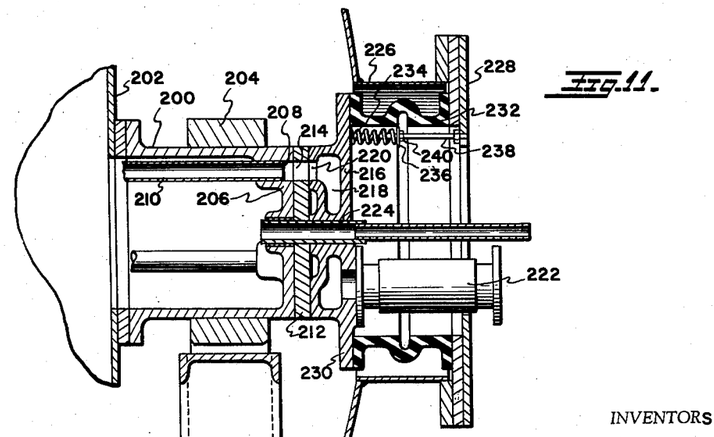
Fig. 11 is an enlarged fragmentary vertical section of a modified form of the filtrate suction and valve assembly.

In Fig. 11 of the drawings a modified form of a cycled valving filtrate discharge is illustrated incorporating a flexible stuffing gland where the filtrate discharge passes through the wall of the filter shell. In this construction a tubular trunnion 200 is secured to the end wall 202 of a rotary filter drum with the trunnion 200 being supported in a bearing 204. The extended end of the trunnion is provided with an enclosing end wall 206 which in turn is provided with a plurality of discharge ports 208 arranged circumferentially about the wall and supporting the extended ends of tubular conduits 210, each conduit extending inwardly through the length of the trunnion and connecting one with each of the plural compartments in the rotary drum.

A wear plate 212 is positioned flush with the outer face of the end wall 206 of the trunnion and is provided with a plurality of ports 214 which align one with each of the discharge ports in the end wall of the trunnion. Located in flush surface to surface contact with the outer face of the wear plate 212 is a valve body 216 which includes a solid body having a circular chamber 218 centrally within the body, with the chamber communicating through a single port 220 outwardly of the body with the outer face of the wear plate in alignment with the circumferentially arranged discharge ports 214 in the wear plate so that rotation of the trunnion and the wear plate relative to the valve body will alternately bring the plural discharge ports therein into coincidence with the single port 220 in the valve body.

A flexible filtrate suction line 222, of which there can be one or more in this construction, extends inwardly through an enlarged opening in the filter shell and communicates through the outer face of the valve body 216 with the central chamber 218 therein providing filtrate discharge connection from the drum through the trunnion, wear plate and valve body chamber outwardly to a collection source not shown.

In addition to the foregoing, a pressure equalizing connection 224 is fastened directly to the trunnion 206, providing for relative rotation between the connection and the valve, said connection having communication with the drum interior. In the present case of a pressure filter construction, connection 224 would have communication with an external source of compressed air or gas equal to the pressure within the pressure shell, while the case of a vacuum filter this connection would be open to the atmosphere.

To complete the valve and suction assembly above described, a cylindrical body 226 is welded or otherwise secured in the enlarged opening in the filter shell wall to extend outwardly for a spaced distance therefrom and to carry annularly thereabout a facing plate 228 which supports together with the outer face of an annular flange 230 on the outer end of the valve body 216 a tubular flexible body 232, of metallic, rubberized or plastic material depending on operating conditions, which has annular flanges at each end lying in abutment with the opposed faces of the facing plate and the valve body flange 230. The flexible body 232 is preferably of a rubberized material which is normally under compression in the described position to insure a tight seal between the inner face of the facing plate and the outer face of the flange 230 thus providing a flexible pressure seal between the valve and shell allowing the valve face to remain exposed for attachment of filter line 222. In addition to the foregoing, a plurality of circumferentially arranged coil springs 234 are located with one end of each seated against the outer face of the valve body and with the second end of each being adjustably seated against a plate 236 carried on a bolt 238 secured to the inner face of the facing plate 228, with the seating plate 236 being resiliently held in place under the adjustable tension of springs 234 by means of a nut 240 on the bolt. This construction provides a continued resilient bias of the nonrotatable valve body against the outer face of the wear plate 212 to insure a seal between the two mating surfaces around the coinciding discharge ports therein.

This last described modification provides a filtrate suction and filtrate valve assembly having the same advantages and serving the same functions as has been heretofore described with respect to the preferred embodiment as illustrated in Figs. 1 through 8 of the drawings.

Figure 12:
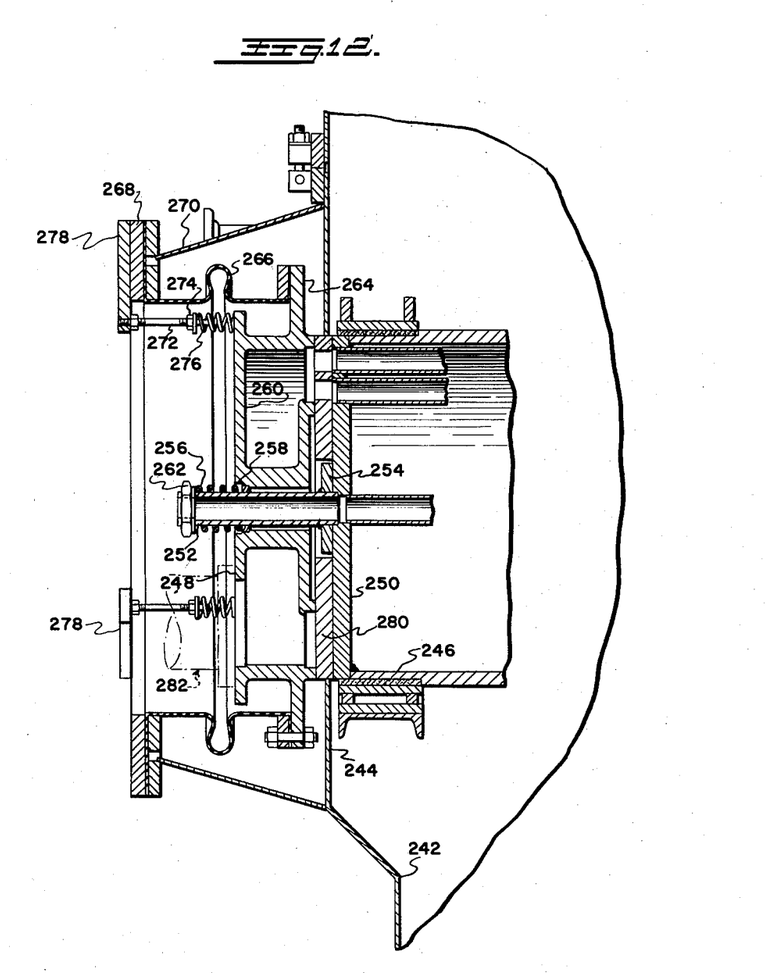
Fig. 12 is an enlarged fragmentary vertical section of still a further modified form of the filtrate suction and valve assembly.

Referring now to Fig. 12 of the drawings, there is shown an additional modification of the filter valve assembly as embodied in the present invention which provides for important and substantial advantages and improvements over prior constructions and which serves to produce new and extremely useful results in the art.

In this important form of the invention the filter shell 242 is provided with an opening in plate 244 concentrically about the axis of the trunnion 246 of a filter drum within the shell which is similar in construction and arrangement to the previously described forms of the present invention. A filtrate valve 248 having a wear plate 280, of the type heretofore described, is positioned against the end plate 250 of the trunnion 246 and a hollow tubular valve stem 252 extends centrally through the valve body where it is flanged as at 254 on its inner end and bolted to the outer face of the trunnion plate 250. A coil spring 256 is placed concentrically about the outer end of the valve stem 252 to seat its inner end in a recess 258 in the outer valve face 260. The spring 256 is adjustably seated at its outer end against a lock nut 262 threaded about the extended end of the stem thereby tensionally retaining the valve and wear plate against the outer face of the trunnion end plate 250.

The valve body is provided with an annular flange 264 to which the inner end of a flexible circular coupling 266, of metallic or ruberized material, is secured, the outer end of the coupling 266 being secured to an annular ring 268 which is supported about the open mouth formed by an outwardly flanged projection 270 of the filter shell about the opening in the plate.

A plurality of bolts 272 are supported about the outer face of the ring 268 by bars 278 and carry on their inner ends adjustable spring seats 274 which support coil springs 276 in resilient abutment with the outer face of the valve 248 at spaced points thereabout thereby resiliently biasing the valve against the end plate 250 of the trunnion 246.

By this construction the obvious advantages gained are the provision of a filtrate valve assembly wherein the valve face is exposed outwardly of the filter shell with a positive seal formed betwen the valve and the shell and by which a drum bailing device, such as a scoop or leaking pump, in the drum interior can have connection to an external source through the hollow valve stem 252, and by which pressure gauge lines and blow connections may be attached directly to the exposed valve face along with filtrate suction lines 282 and the like.

The drive ends of the modifications shown in Figs. 10, 11 and 12 have not been illustrated as they may be identical to the driven trunnion assembly described in reference to Figs. 1 to 8 of the drawings.

Having thus described the structural and functional advantages and features of the present invention in its preferred and modified embodiments, and clearly and specifically disclosing a new and improved rotary pressure-type filter which satisfies all of the objects and advantages heretofore set forth, what is desired to be claimed is:

1. An industrial filter including a shell; a rotary filter apparatus within the shell; a trunnion projecting from opposite ends of the filter apparatus and terminating within the shell; a trunnion bearing for each of the trunnions positioned within the shell; means supporting each of the trunnion bearings within the shell and from the wall of the shell; drive means for the rotary filter including a drive shaft projecting into the shell; means rotatably supporting the drive shaft from the wall of the shell; cooperating spline means on one of the trunnions and on the drive shaft; a filter valve supported at the end of the other of the trunnions; said filter valve including a valve plate secured to rotate with the said other trunnion and providing ported communication with the interior of the filter apparatus through the trunnion; rigid axial shaft means projecting from said valve plate; a non-rotatable valve body mounted on said axial shaft means whereby the valve body is axially aligned with the valve plate; flexible conduit means secured to the wall of the shell; and to the valve body and resilient means normally urging said valve body into mating face to face engagement with said valve plate.

2. The invention defined in claim 1 wherein said resilient means are interposed between the shell and the valve body.

References Cited in the file of this patent
UNITED STATES PATENTS

| | | |
|---|---|---|
| 337,037 | White | Mar. 2, 1886 |
| 1,607,362 | Powers | Nov. 16, 1926 |
| 1,726,483 | Giesler | Aug. 27, 1929 |
| 1,871,627 | Massa | Aug. 16, 1932 |
| 1,945,776 | Hait | Feb. 6, 1934 |
| 2,337,038 | Feutness | Dec. 21, 1943 |
| 2,489,681 | Smith et al. | Nov. 29, 1949 |
| 2,655,265 | Little | Oct. 13, 1953 |
| 2,678,133 | Thayer et al. | May 11, 1954 |
| 2,698,013 | Brill et al. | Dec. 28, 1954 |

FOREIGN PATENTS

| | | |
|---|---|---|
| 493,794 | Great Britain | June 2, 1938 |

UNITED STATES PATENT OFFICE

CERTIFICATE OF CORRECTION

Patent No. 2,899,068                                            August 11, 1959

Donald L. King et al.

It is hereby certified that error appears in the printed specification of the above numbered patent requiring correction and that the said Letters Patent should read as corrected below.

Column 10, line 23, after "shell" strike out the semi-colon; same line 23, after "body" insert a semi-colon.

Signed and sealed this 12th day of April 1960.

(SEAL)
Attest:

KARL H. AXLINE                                               ROBERT C. WATSON
Attesting Officer                                          Commissioner of Patents